(No Model.) 2 Sheets—Sheet 2.
W. T. GOODWIN, Jr.
MACHINE FOR MAKING POP CORN BALLS.
No. 377,303. Patented Jan. 31, 1888.
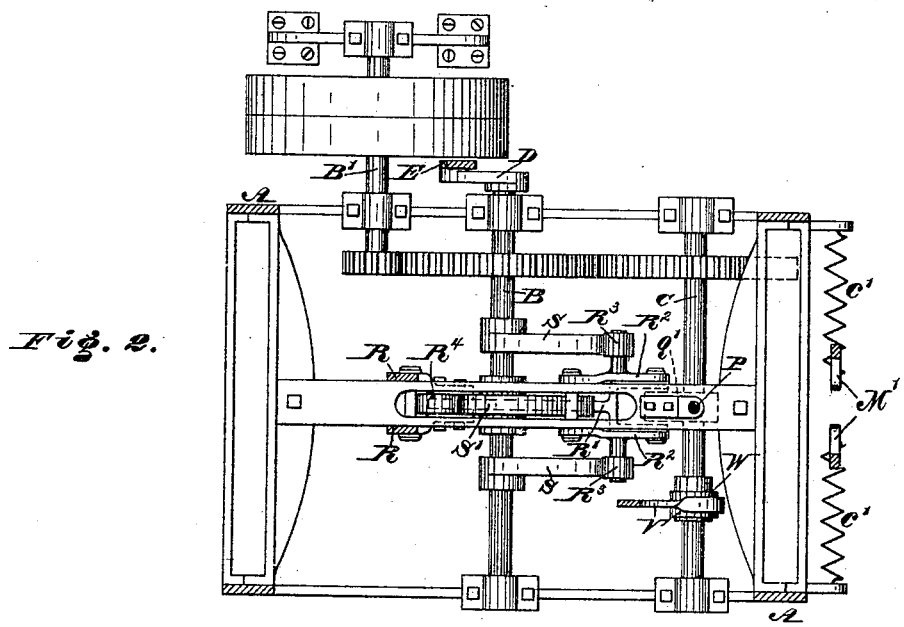
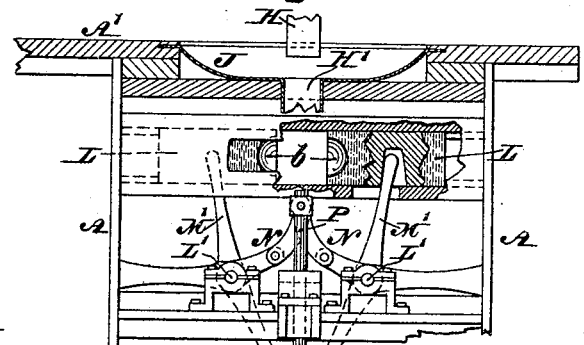
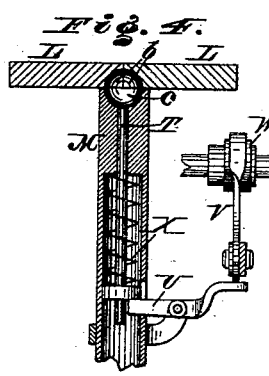
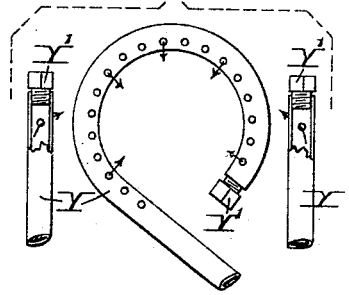
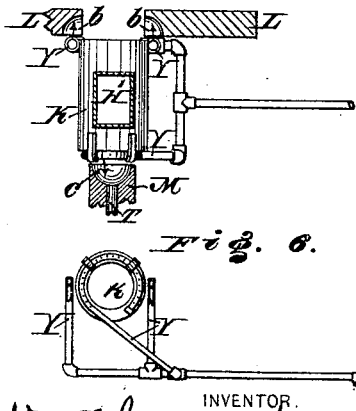
WITNESSES:
Jas. H. Kelly
L. Douville
INVENTOR.
Wm. T. Goodwin, Jr.
BY John A. Wiederheim
ATTORNEY.

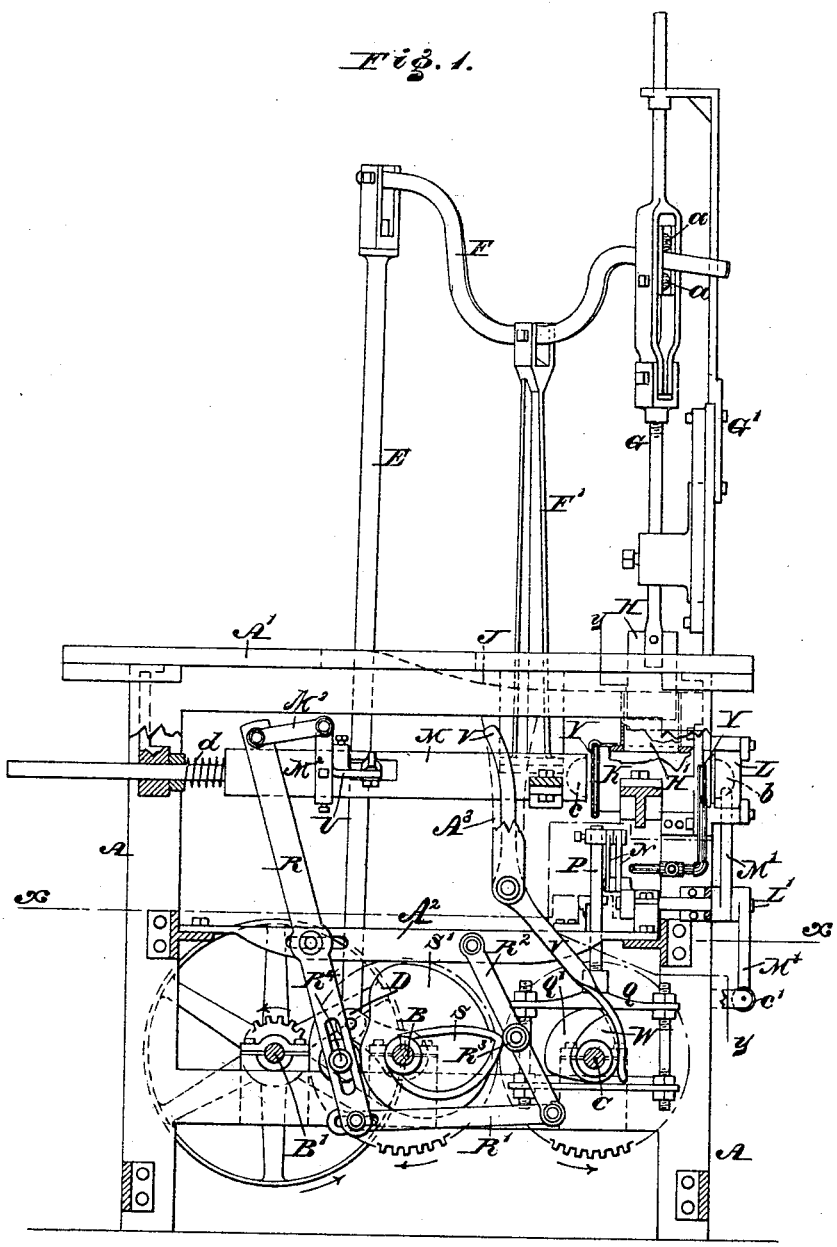

United States Patent Office.

WILLIAM T. GOODWIN, JR., OF PHILADELPHIA, PENNSYLVANIA.

MACHINE FOR MAKING POP-CORN BALLS.

SPECIFICATION forming part of Letters Patent No. 377,303, dated January 31, 1888.

Application filed April 26, 1887. Serial No. 236,187. (No model.)

*To all whom it may concern:*

Be it known that I, WILLIAM T. GOODWIN, Jr., a citizen of the United States, residing in the city and county of Philadelphia, State of Pennsylvania, have invented a new and useful Improvement in Machines for Making Pop-Corn Balls, which improvement is fully set forth in the following specification and accompanying drawings.

My invention consists of improvements in machines for making pop-corn balls, as will be hereinafter fully set forth.

Figure 1 represents a side elevation, partly sectional, of a machine embodying my invention. Fig. 2 represents a partial top view and partial horizontal section thereof in line $x\ x$, Fig. 1. Fig. 3 represents a transverse vertical section of a portion in line $y\ y$, Fig. 1. Fig. 4 represents a sectional view of the plunger, showing the throw-off with adjacent operating mechanism therefor as embodied in my invention. Fig. 5 represents a plan view of the charger shown in Fig. 1 with adjacent parts. Fig. 6 represents an end view of the charger with steam-pipes connected therewith. Fig. 7 represents an enlarged view of the steam-pipes shown in Fig. 6.

Similar letters of reference indicate corresponding parts in the several figures.

Referring to the drawings, A represents the main frame of the machine, and B the driving-shaft thereof, said shaft being geared with the pulley-shaft B' and gearing with a counter-shaft, C, mounted on the frame A.

Keyed or otherwise secured to the shaft B is a crank-arm, D, to which is attached the vertically-arranged connecting-rod E, the upper end whereof is pivoted to the beam F, whose axis is on a column or standard, F', which rises from the frame A. The end of the beam F is fitted between rollers $a$ on a rising and falling rod or bar, G, which is vertically guided in arms of an upright, G', secured to the frame A. The lower end of the rod G carries the plunger H, which, as will be seen, is located over the discharge-throat H' of a pan or supply-tray, J, which latter is secured to the table A' at the top of the frame A. The throat H' extends vertically, and is secured at the bottom to a horizontally-arranged charger or charging-tube, K, which is supported on the frame of the machine and has both ends open.

Located at one end of the charger are slides L L, the inner end of each of which has an opening, $b$, which in the present case is of the form of the quarter of a sphere. At the opposite end of the charger is a plunger, M, the end of which has an opening, $c$, which in the present case is semi-spherical, the openings $b\ c$ together being of the form of a complete sphere and constituting a mold for making confectionery, especially of ball shape. The slides L are arranged at a right angle to the charger K, and the plunger M is arranged in line with said charger and adapted to enter the same. The slides L are operated by the levers M', the ends of which are inserted in recesses in said slides. The said levers are mounted on the frame A, and have their axes on shafts L', to which are secured the jointed arms N N, which latter are pivoted at their other ends to a collar on the sliding rod P, which is guided in a vertical direction on the frame A, said rod P being connected with a yoke or cross head, Q, which is engaged by a cam, Q', secured to the counter-shaft C, whereby by the operation of said cam the rod is raised and lowered, and thus by means of the intermediate parts the slides L of the mold are closed and opened, the closing motions being assisted by springs $c'$, secured to the levers M' and frame A. The plunger M has secured to it a sleeve, M², adjustable thereon by means of a set-screw, to which sleeve is pivotally fastened an arm or link, M³. To the link is pivotally secured the upper end of a swinging arm, R, the latter being pivotally secured in a slot in the portion A² of the frame of the device. The lower end of the said arm R is pivotally secured to a connecting-rod, R', the said pivotal connection being in a slot at or near one end of said rod. The other end of the rod R' is pivotally attached to the lower end of the swinging arm R², which is pivoted at its upper end to the portion A² of the frame and carries on studs on its sides the rollers R³, which latter are engaged by cams S, secured to the shaft B. A cam, S', is also secured to said shaft, and engages with a roller, R⁴, on arm R, it being noticed that by means of the bar R', arm R², and cams S S' motions are imparted to the arm R in opposite directions, whereby the plunger M is advanced and returned within the charger and to and from the mold-carrying slides L. A spring, $d$, suitably applied, is employed to assist the advance of the plunger.

Within the plunger M is fitted a sliding rod or throw-off, T, and to said plunger is pivoted a lever, U, one end of which enters the plunger and engages with the rod T, so as to advance the same, and the other end being outside of the plunger and engaged by a lever, V, which is mounted on the depending piece $A^3$ of the frame A and operated in one direction by a cam, W, secured to the counter-shaft C. Pressing against the rod T is a spring, X, for causing the return motion thereof and of the lever V. At the opposite ends of the charger K are perforated steam-pipes Y, which are suitably supported on the frame A and have their perforations facing the mold-openings $b$ $c$, respectively, whereby steam may be injected thereinto for preventing sticking of the shaped confectionery in the mold.

The operation is as follows: The tray J is supplied with suitable material and the machine started. The material is forced through the throat H' into the charger K, and the slides L close. The plunger M advances and forces the material toward the slide L and compresses the same into the mold formed by the openings $b\ b\ c$, thus producing in the present case a spherical mass or ball, which may be popcorn or other confectionery. The slides L now separate. The rod T then advances and strikes the molded ball, so that it drops and may be collected. The plunger M returns to its first position, the plunger H ascends, and other parts assume their first position, whereby the operations of the machine may be repeated. In order to cleanse the pipes Y, the same have screw-plugs Y', which, when removed, open the ends of said pipes, for evident purposes.

Having thus described my invention, what I claim as new, and desire to secure by Letters Patent, is—

1. In a device of the character named, a pan with a discharge-throat, in combination with a charger fed from said throat, sliding sectional molds at one end of said charger, and a plunger having a sectional mold and adapted to enter said charger, substantially as described.

2. A pan having a discharge-throat, a charger fed from said throat, sliding sectional molds, and a plunger and perforated steam-pipes at the ends of said charger, said parts combined and operated substantially as described.

3. The slides L, each carrying a section of a mold, in combination with the levers M', rocking shafts, the jointed arms N, the rod P, and mechanism, substantially as described, connected to said rod P for operating the same, substantially as described.

4. A charger, the slides L, each having a sectional mold, a plunger provided with a mold, a spring throw-off within said plunger, the pivoted lever U, and mechanism, substantially as described, connected to a rotary shaft and adapted to operate the said lever U, said parts being combined substantially as and for the purpose set forth.

5. The plunger M, provided with mold $c$, the rod T in said plunger, the spring X, encircling said rod, the lever U, connected with said plunger and engaging with said rod, the swinging lever V, and mechanism, substantially as described, connected to the driving-shaft, for operating said swinging lever V, said parts being combined substantially as and for the purpose set forth.

6. The frame A, the shaft B, the crank-arm D, connected to said shaft B, the rod E, the pivoted beam F, the rising and falling bar G, with rollers $a$, the upright G', the plunger H, attached to lower end of said bar G, and the tray J, with discharge-throat H, said parts being combined substantially as and for the purpose set forth.

WM. T. GOODWIN, JR.

Witnesses:
  L. DOUVILLE,
  JOHN A. WIEDERSHEIM.